(12) United States Patent
Kim et al.

(10) Patent No.: US 12,027,957 B2
(45) Date of Patent: Jul. 2, 2024

(54) MOTOR ASSEMBLY

(71) Applicant: Samsung Electronics Co., Ltd., Gyeonggi-do (KR)

(72) Inventors: Hansang Kim, Gyeonggi-do (KR); Yongsuk Kwak, Gyeonggi-do (KR); Eungkyu Park, Gyeonggi-do (KR); Dongyeop Lee, Gyeonggi-do (KR); Changhoon Im, Gyeonggi-do (KR); Kwangil Kim, Gyeonggi-do (KR); Hwagyu Song, Gyeonggi-do (KR); Jin You, Gyeonggi-do (KR); Sungcheol Lee, Gyeonggi-do (KR); Hyounggil Choi, Gyeonggi-do (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 319 days.

(21) Appl. No.: 17/536,447

(22) Filed: Nov. 29, 2021

(65) Prior Publication Data

US 2022/0131444 A1 Apr. 28, 2022

Related U.S. Application Data

(63) Continuation of application No. PCT/KR2021/015012, filed on Oct. 25, 2021.

(30) Foreign Application Priority Data

Oct. 27, 2020 (KR) .................. 10-2020-0139931

(51) Int. Cl.
*H02K 9/06* (2006.01)
*H02K 9/22* (2006.01)
*H02K 11/33* (2016.01)

(52) U.S. Cl.
CPC ............... *H02K 9/06* (2013.01); *H02K 9/227* (2021.01); *H02K 11/33* (2016.01)

(58) Field of Classification Search
CPC .............................. H02K 9/227; H02K 11/33
See application file for complete search history.

(56) References Cited

U.S. PATENT DOCUMENTS

2001/0024071 A1  9/2001  Yoshida et al.
2007/0103011 A1* 5/2007  Neal .................. H02K 5/08
                                              310/43

(Continued)

FOREIGN PATENT DOCUMENTS

JP  2000050538 A  *  2/2000
JP  2001-245447 A     9/2001

(Continued)

OTHER PUBLICATIONS

WO-2019212294-A1_translate (Year: 2019).*

(Continued)

*Primary Examiner* — Tulsidas C Patel
*Assistant Examiner* — Mohammed Ahmed Qureshi
(74) *Attorney, Agent, or Firm* — Cha & Reiter, LLC

(57) ABSTRACT

According to an embodiment of the disclosure, a motor assembly may include a stator including a coil; a rotor accommodated inside the stator and configured to rotate; first and second housings coupled to first and second sides of the stator; an impeller disposed in a first direction of the first housing and configured to rotate together with the rotor by being coupled to one side of the rotor; a cover having an opening through which air is introduced by rotation of the impeller, and configured to protect the impeller; and a heat dissipation member surrounding at least a portion of an outer surface of the stator and configured to reduce heat generated in the motor assembly as the rotor rotates. Therefore, it is (Continued)

possible to minimize vibration caused by the rotation of the motor, thereby reduce noise, and lower heat generated inside the motor. Other various embodiments are possible.

18 Claims, 6 Drawing Sheets

(56) References Cited

U.S. PATENT DOCUMENTS

| | | | |
|---|---|---|---|
| 2011/0001368 A1* | 1/2011 | Lau | H02K 9/06 310/64 |
| 2017/0187254 A1* | 6/2017 | Klassen | H02K 9/00 |
| 2019/0017517 A1 | 1/2019 | Teramoto | |
| 2020/0204034 A1 | 6/2020 | Shin et al. | |
| 2021/0235951 A1 | 8/2021 | Hwang et al. | |

FOREIGN PATENT DOCUMENTS

| | | | |
|---|---|---|---|
| JP | 2009-165294 A | | 7/2009 |
| JP | 2011-205894 A | | 10/2011 |
| KR | 1997-0011910 B1 | | 7/1997 |
| KR | 10-2008-0018745 A | | 2/2008 |
| KR | 10-2054681 B1 | | 12/2019 |
| KR | 10-2080033 B1 | | 2/2020 |
| TW | I-639292 B | * | 10/2018 |
| WO | WO-2019212294 A1 | * | 11/2019 ........... A47L 5/24 |

OTHER PUBLICATIONS

TWI-639292-B_translate (Year: 2018).*
JP-2000050538-A_translate (Year: 2000).*
International Search Report dated Jan. 28, 2022.
Written Opinion dated Jan. 28, 2022.
Notice of Publication dated May 5, 2022.

* cited by examiner

MOTOR ASSEMBLY

CROSS-REFERENCE TO RELATED APPLICATION(S)

This application is a continuation of International Application No. PCT/KR2021/015012, filed on Oct. 25, 2021, which claims priority to Korean Patent Application No. 10-2020-0139931, filed on Oct. 27, 2020 in the Korean Intellectual Property Office, the disclosures of which are herein incorporated by reference.

TECHNICAL FIELD

One or more embodiments of the instant disclosure generally relate to a motor assembly including a heat dissipation member and a heat transfer member.

BACKGROUND ART

A motor is a device that generates a rotational force by converting electrical energy into mechanical energy, and may be an alternating current (AC) motor and a direct current (DC) motor.

An AC motor may use a 3-phase or 4-phase inverter to change the direction of current. An DC motor may rotate a rotor when the direction of current is changed in the rotor while an electromagnetic force generated from a stator is applied to the rotor.

For example, the rotor is constructed to interact electromagnetically with the stator, and may be rotated by a force generated between a magnetic field and a current flowing in a coil of the stator.

SUMMARY

Motors may be widely used in household electronic products, such as, for example, vacuum cleaners, blenders, mixers, or robotic cleaners, and also other industrial devices.

For example, the motor may be used in a vacuum cleaner. The vacuum cleaner may suck in air containing foreign matters such as dust by using air pressure generated by the rotation of the rotor included in the motor.

In this case, the motor may generate noise due to vibration caused by the rotation of the rotor. In addition, the motor may generate high-temperature heat in the coil of the stator as the rotor rotates.

Such noise and heat generated by the motor may cause inconvenience to the user of electronic devices such as the vacuum cleaner.

Certain embodiments of the instant disclosure may provide a motor assembly in which noise and heat generated by motor rotation are reduced.

A motor assembly according to an embodiment of the disclosure may include a stator including a coil; a rotor accommodated inside the stator and configured to rotate; first and second housings coupled to first and second sides of the stator; an impeller disposed in a first direction of the first housing and configured to rotate together with the rotor by being coupled to one side of the rotor; a cover having an opening through which air is introduced by rotation of the impeller, and configured to protect the impeller; and a heat dissipation member surrounding at least a portion of an outer surface of the stator and configured to reduce heat generated in the motor assembly as the rotor rotates.

According to certain embodiments, by disposing the heat dissipation member to surround the outer surface of the stator in the motor, and by disposing the heat transfer member or vibration-proof member between the stator and the heat dissipation member, it is possible to minimize vibration caused by the rotation of the motor, thereby reduce noise, and lower heat generated inside the motor.

DETAILED DESCRIPTION

Figure 1:
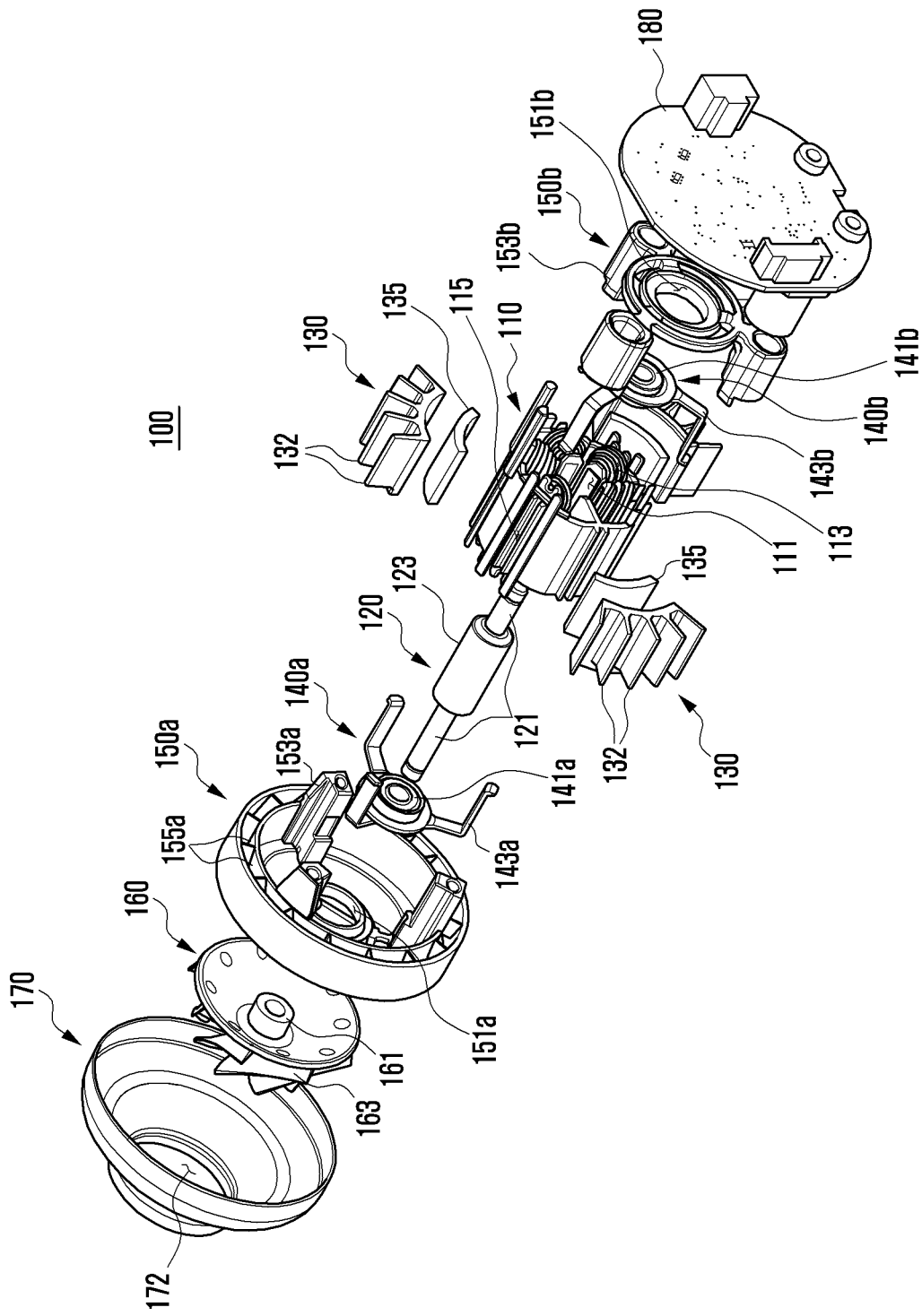
FIG. 1 is an exploded perspective view schematically illustrating a part of a motor assembly according to an embodiment of the disclosure.

It should be appreciated that various embodiments of the disclosure and the terms used therein are not intended to limit the technological features set forth herein to particular embodiments and include various modifications, equivalents, and/or alternatives to a corresponding embodiment. With regard to the description of the drawings, similar reference numerals may be used to refer to similar or related elements. It is to be understood that a singular form of a noun corresponding to an item may include plural forms as well, unless the relevant context clearly indicates otherwise. In the disclosure, such terms as "$1^{st}$" and "$2^{nd}$", or "first" and "second" may be used to simply distinguish a corresponding component from another, and does not limit the components in other aspect (e.g., importance or order).

A motor assembly according to various embodiments of the disclosure may be applied to various electronic devices. The electronic devices may include, for example, household electronic products, such as, for example, a vacuum cleaner, a blender, a mixer, or a robot cleaner, and industrial devices.

Hereinafter, a motor assembly according to various embodiments of the disclosure will be described with reference to the accompanying drawings.

Figure 2:
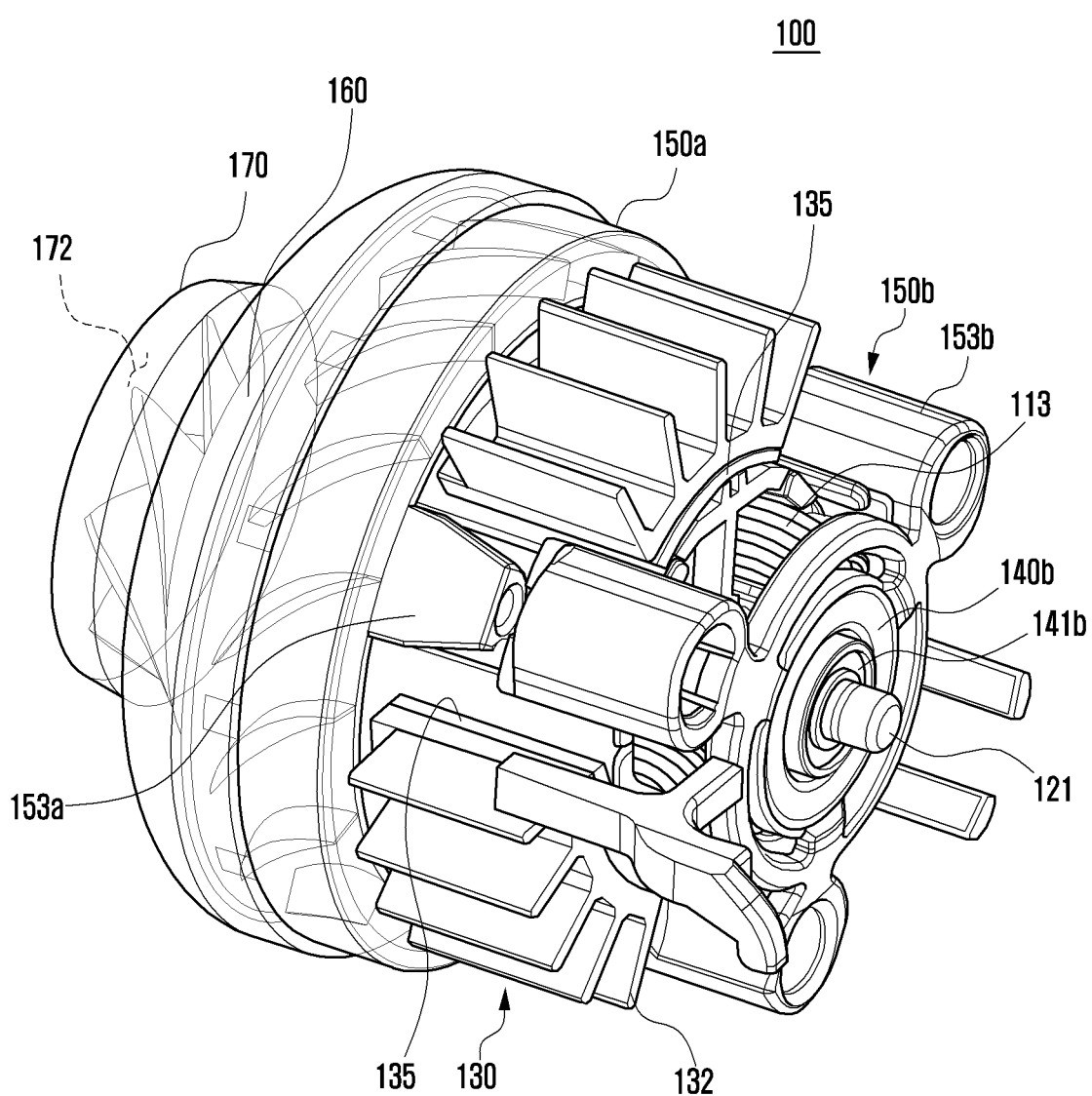
FIG. 2 is a combined perspective view schematically illustrating a part of a motor assembly according to an embodiment of the disclosure.

FIG. 1 is an exploded perspective view schematically illustrating a part of a motor assembly according to an embodiment of the disclosure. FIG. 2 is a combined perspective view schematically illustrating a part of a motor assembly according to an embodiment of the disclosure.

With reference to FIGS. 1 and 2, the motor assembly 100 according to an embodiment of the disclosure may include a stator 110, a rotor 120, a heat dissipation member 130, a heat transfer member 135, a first support member 140a, a second support member 140b, a first housing 150a, a second housing 150b, an impeller 160, a cover 170, and/or a printed circuit board 180.

According to an embodiment, the stator 110, the rotor 120, the first housing 150a, and/or the second housing 150b may constitute a motor assembly 100.

According to an embodiment, the stator 110 may generate an electromagnetic force resulting from a driving signal received from a motor driver (e.g., a processor) (not shown) mounted on the printed circuit board 180. By generating the electromagnetic force corresponding to a predetermined direction or speed in response to the signal received from the printed circuit board 180, the stator 110 may stimulate a magnet 123 provided in the rotor 120 and thereby rotate a rotating shaft 121 of the rotor 120.

According to an embodiment, the stator 110 may include a rotor receiving part 111, a coil 113, and/or a slot 115. The rotor receiving part 111 may have a hole formed in the center thereof. The rotor receiving part 111 may accommodate the rotor 120. The coil 113 may be disposed outside the rotor receiving part 111. The coil 113 may be wound around a core (not shown) and be disposed within the stator 110. The coil 113 may generate magnetic flux when a current is applied from the motor driver (not shown) of the printed circuit board 180. The slot 115 may be formed on the outer surface of the stator 110 so that a first coupling part 143*a* of the first support member 140*a* and a second coupling part 143*b* of the second support member 140*b* are placed and coupled.

According to an embodiment, the rotor 120 may be accommodated inside the stator 110 and configured to rotate. The rotor 120 may be disposed by being inserted into the rotor receiving part 111 formed in the central portion of the stator 110. The rotor 120 may be combined with the stator 110. The rotor 120 may electromagnetically interact with the stator 110.

According to an embodiment, the rotor 120 may include the rotating shaft 121 and the magnet 123. The magnet 123 may be coupled to the outer surface of the rotating shaft 121. The rotating shaft 121 may be configured to rotate when the rotor 120 electromagnetically interacts with the stator 110. For example, the rotating shaft 121 of the rotor 120 may be rotated according to an induced current of the magnet 123 interacting with an electromagnetic force generated by the stator 140.

According to an embodiment, the heat dissipation member 130 may be disposed to surround at least a portion of the outer surface of the stator 110. The heat dissipation member 130 may discharge heat generated from the coil 113 of the stator 110 during the rotation of the rotor 120, to the outside of the motor assembly 100. The heat dissipation member 130 may also reduce vibration of the motor. For example, the heat dissipation member 130 may surround at least a portion of the outer surface of the stator 110, and attenuate the vibration of the stator 110 caused by the rotation of the rotor 120.

According to an embodiment, the heat dissipation member 130 may include a plurality of heat dissipation fins 132 on an outer surface thereof. The heat dissipation fins 132 of the heat dissipation member 130 may be configured to extend radially. The heat dissipation member 130 is capable of reducing the temperature of the motor assembly 100 by cooling or discharging heat generated from the motor assembly 100. The heat dissipation member 130 may be, for example, a heat sink. The heat dissipation member 130 may be made of a graphite material. The heat dissipation member 130 may include at least one of a graphite sheet, a heat pipe, and a vapor chamber.

According to an embodiment, in consideration of the arrangement with other components (e.g., the slot 115) disposed on the outer surface of the stator 110, the heat dissipation member 130 may be constructed to be separated or integrated in the circumferential direction with other components of the motor. The heat dissipation member 130 may be made of metal (e.g., copper or aluminum) or plastic. The heat dissipation member 130 may be manufactured through extrusion, processing, or injection molding. The outer surface of the heat dissipation member 130 may have a black or anodizing coating. The outer surface of the heat dissipation member 130 may be coated with a material of various colors instead of the black or anodizing coating. The black or anodizing coating applied to the outer surface of the heat dissipation member 130 may prevent rust or corrosion from occurring on the outer surface of the heat dissipation member 130.

According to an embodiment, the heat transfer member 135 may be disposed between the stator 110 and the heat dissipation member 130. The heat transfer member 135 may be disposed on at least a portion of the outer surface of the stator 110 and attenuate the vibration of the stator 110 caused by the rotation of the rotor 120. The heat transfer member 135 may be, for example, a vibration-proof member.

According to an embodiment, the heat transfer member 135 may transfer heat, generated from the coil 113 of the stator 110 during the rotation of the rotor 120, to the heat dissipation member 130. The heat dissipation member 130 may direct heat transferred by the heat transfer member 135 away from the rest of the motor. For example, the heat dissipation member 130 may discharge heat transferred by the heat transfer member 135 to the outside of the motor assembly 100.

According to an embodiment, the heat transfer member 135 may include at least one of a thermal interface material (TIM) and graphite. The heat transfer member 135 may be made of a vibration-proof material for damping the vibration of the stator 110 caused by the rotation of the rotor 120. The heat transfer member 135 may be made to be thicker than the space between the stator 110 and the heat dissipation member 130, and may be deformed to have a reduced thickness when the heat dissipation member 130 is fastened to it so that a fastening component of the heat dissipation member 130 applies pressure to the heat transfer member 135. The heat dissipation member 130 may be fixed in the motor assembly 100 by, for example, the first housing 150*a* and the second housing 150*b*.

According to an embodiment, the first support member 140*a* may be disposed in a first direction (e.g., a left side) of the rotor 120. The first support member 140*a* may be coupled to the first direction (e.g., the left side) of the stator 110.

According to an embodiment, the first support member 140*a* may include a first bearing 141*a* and a first coupling part 143*a*. The first bearing 141*a* may be disposed at the center of the first support member 140*a*. The first bearing 141*a* may be inserted in the first direction (e.g., the left side) of the rotating shaft 121 of the rotor 120. The first coupling part 143*a* may extend from the outer circumferential surface of the first support member 140*a* in the axial direction (e.g., in a second direction towards a right side). The first coupling part 143*a* may be coupled to the second coupling part 143*b* of the second support member 140*b* through the slot 115 formed on the outer surface of the stator 110.

According to an embodiment, the second support member 140*b* may be disposed in the second direction (e.g., the right side) of the rotor 120. The second support member 140*b* may be coupled to the second direction (e.g., the right side) of the stator 110.

According to an embodiment, the second support member 140*b* may include a second bearing 141*b* and a second coupling part 143*b*. The second bearing 141*b* may be disposed at the center of the second support member 140*b*. The second bearing 141*b* may be inserted in the second direction (e.g., the right side) of the rotating shaft 121 of the rotor 120. The second coupling part 143*b* may extend from the outer circumferential surface of the second support member 140*b* in the axial direction (e.g., in the first direction toward the left side). The second coupling part 143*b* may be coupled to the first coupling part 143*a* of the first support member 140*a* through the slot 115 formed on the outer surface of the stator 110.

According to an embodiment, the first support member 140*a* and the second support member 140*b* may be coupled together with the stator 110 interposed therebetween. The first support member 140*a* and the second support member 140*b* may support the stator 110 while being disposed in the first direction (e.g., the left side) and the second direction (e.g., the right side) of the stator 110, respectively. The first and second support members 140*a* and 140*b* may suppress the vibration of the stator 110 caused by the rotation of the rotor 120.

According to an embodiment, each of the first coupling part 143*a* of the first support member 140*a* and the second coupling part 143*b* of the second support member 140*b* may consist of at least one such part. For example, although each of the first and second coupling parts 143*a* and 143*b* is shown as three parts in FIG. 1, the number is not limited thereto and may be varied as long as they can support the stator 110 from both sides. The first and second coupling parts 143*a* and 143*b* may be equal to each other in number. The first and second coupling parts 143*a* and 143*b* may be coupled through, for example, bonding or interference fitting.

According to an embodiment, it is described above that the first bearing 141*a* is disposed at the center of the first support member 140*a*, and in addition the first bearing 141*a* may be placed in the center of the first support member 140*a* in a state of being coupled to the first direction (e.g., the left side) of the rotating shaft 121 of the rotor 120. Similarly, it is described above that the second bearing 141*b* is disposed at the center of the second support member 140*b*, and in addition the second bearing 141*b* may be placed in the center of the second support member 140*b* in a state of being coupled to the second direction (e.g., the right side) of the rotating shaft 121 of the rotor 120. The first bearing 141*a* and the second bearing 141*b* may be configured to allow the rotating shaft 121 of the rotor 120 to rotate.

According to an embodiment, the first housing 150*a* and the second housing 150*b* may be coupled to the stator 110. The first housing 150*a* and the second housing 150*b* may be configured to fix the stator 110. The first housing 150*a* and the second housing 150*b* may be coupled with the stator 110 and the rotor 120 interposed therebetween. Between the first housing 150*a* and the second housing 150*b*, the stator 110 may be disposed to be fixed, and the rotor 1120 may be disposed to rotate.

According to an embodiment, the first housing 150*a* may be disposed in the first direction (e.g., the left side) of the rotor 120. The first housing 150*a* may be coupled to the first direction (e.g., the left side) of the stator 110.

According to an embodiment, the first housing 150*a* may include a first engaging part 151*a*, a first fastening part 153*a*, and a guide hole 155*a*. The first engaging part 151*a* may be formed in the center of the first housing 150*a*. The first engaging part 151*a* may engage with at least a portion of the first bearing 141*a*. The first fastening part 153*a* may extend in the axial direction (e.g., the second direction toward the right side) from a certain location of the first housing 150*a*. The first fastening part 153*a* may be fastened to the second fastening part 153*b* of the second housing 150*b*. For example, the first fastening part 153*a* and the second fastening part 153*b* may be joined through bolts. The guide hole 155*a* may guide the flow of air from the outside of the motor assembly 100.

According to an embodiment, the second housing 150*b* may be disposed in the second direction (e.g., the right side) of the rotor 120. The second housing 150*b* may be coupled to the second direction (e.g., the right side) of the stator 110.

According to an embodiment, the second housing 150*b* may include a second engaging part 151*b* and a second fastening part 153*b*. The second engaging part 151*b* may be formed in the center of the second housing 150*b*. The second engaging part 151*b* may engage with at least a portion of the second bearing 141*b*. The second fastening part 153*b* may extend in the axial direction (e.g., the first direction toward the left side) from a certain location of the second housing 150*b*. The second fastening part 153*b* may be fastened to the first fastening part 153*a* of the first housing 150*a*.

According to an embodiment, each of the first fastening part 153*a* of the first housing 150*a* and the second fastening part 153*b* of the second housing 150*b* may consist of at least one such part. For example, although each of the first and second fastening parts 153*a* and 153*b* is shown as three parts in FIG. 1, the number is not limited thereto and may be varied as long as they can support the stator 110 from both sides.

According to an embodiment, the impeller 160 may be disposed in the first direction (e.g., the left side) of the first housing 150*a*. The impeller 160 may be coupled to an end of the rotating shaft 121 in the first direction (e.g., the left side), and may be rotated together with the rotating shaft 121 to generate air flow. The impeller 160 may be disposed between the first housing 150*a* and the cover 170.

According to an embodiment, the impeller 160 may include a shaft coupling part 161 and a wing part 163. The shaft coupling part 161 may be formed in the center of the impeller 160. The shaft coupling part 161 may be coupled to an end of one side (e.g., the left side) of the rotating shaft 121. The wing part 163 may be configured to protrude from the outer surface of the impeller 160, thus causing air flow when the impeller 160 rotates. The wing part 163 may be configured to cause an airflow in response to the rotation of the impeller 160.

According to an embodiment, the cover 170 may be disposed in the first direction (e.g., the left side) of the impeller 160. The cover 170 may protect the impeller 160. The cover 170 may be coupled to a first surface (e.g., a left surface) of the first housing 150*a*.

According to an embodiment, the cover 170 may have an opening 172. The opening 172 may be constructed to allow air to be sucked in and introduced in response to the rotation of the impeller 160.

According to an embodiment, the printed circuit board 180 may be disposed in the second direction (e.g., the right side) of the second housing 150*b*. The printed circuit board 180 may include a motor driver (not shown). The printed circuit board 180 may control the driving of the motor. The printed circuit board 180 may be configured to transmit a driving signal to the stator 110 so that the stator 110 generates an electromagnetic force.

According to an embodiment, the printed circuit board 180 may include a motor driver, a processor, a memory, and/or at least one sensor, which are not shown in the drawings. The at least one sensor may include, for example, at least one of a gesture sensor, a gyro sensor, a barometric pressure sensor, an acceleration sensor, a proximity sensor, an infrared (IR) sensor, a temperature sensor, a humidity sensor, or an illuminance sensor.

Figure 3:
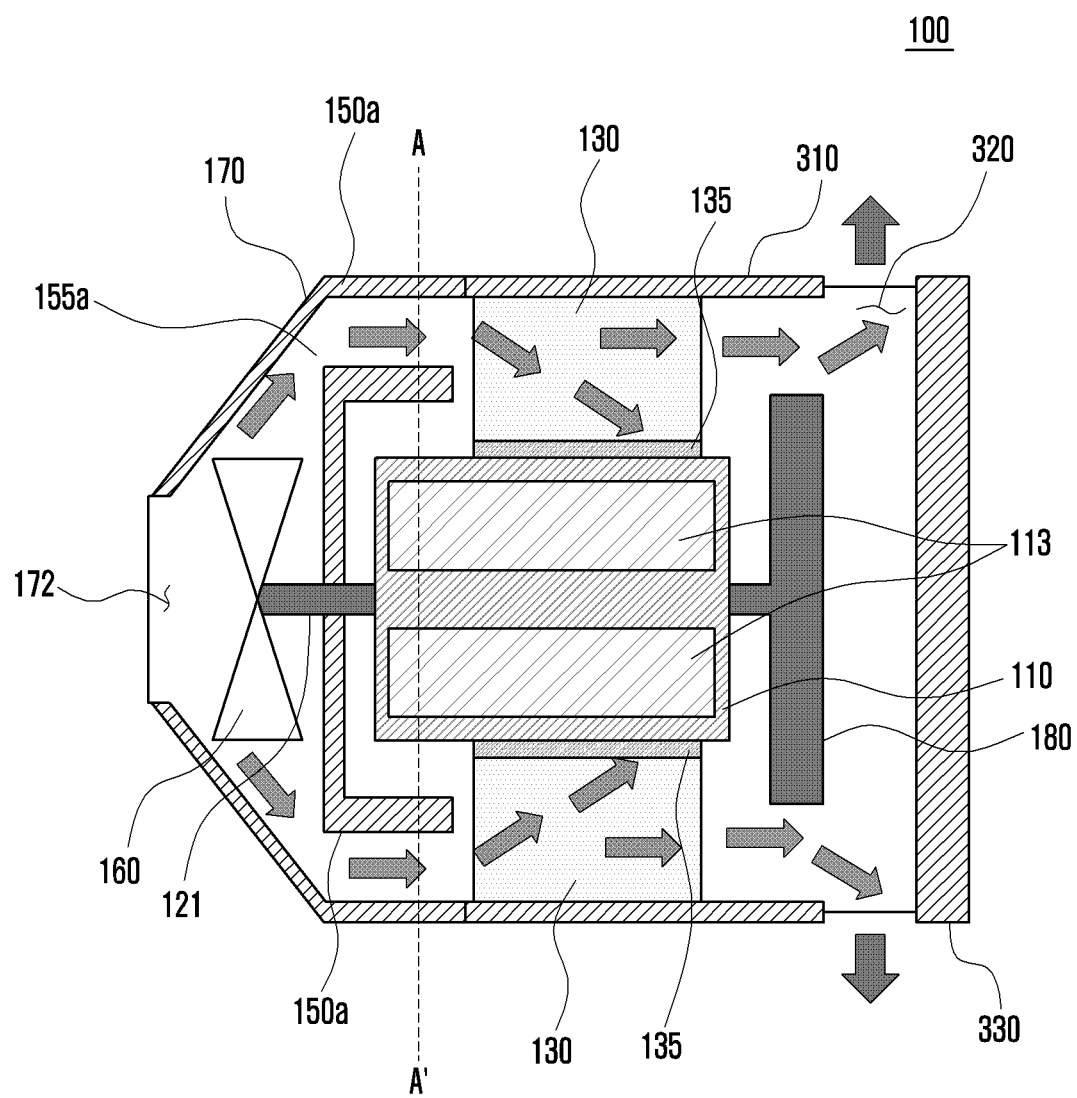
FIG. 3 is a view illustrating the driving of a motor assembly according to an embodiment of the disclosure.

FIG. 3 is a view illustrating the driving of a motor assembly according to an embodiment of the disclosure.

Figure 4:
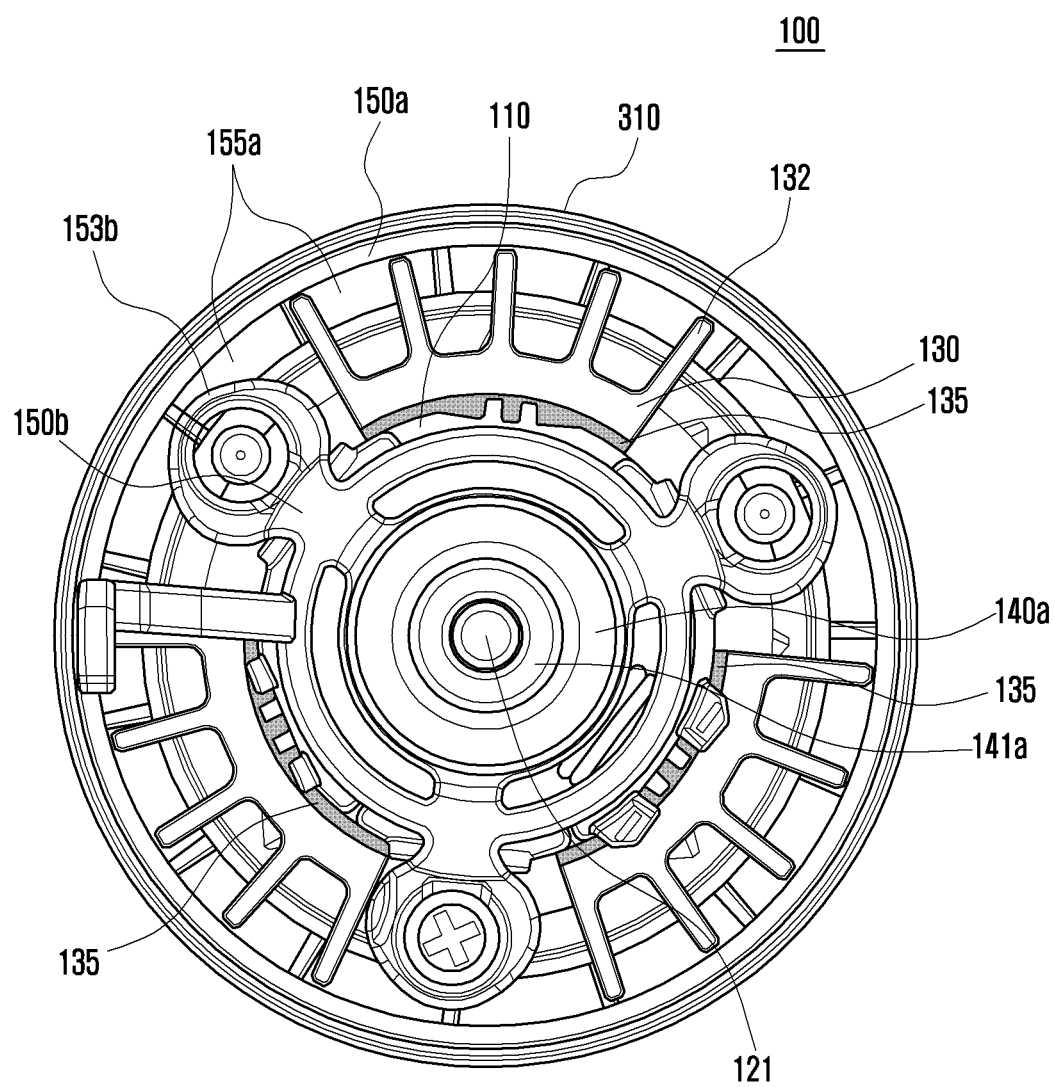
FIG. 4 is a view schematically illustrating a cross section taken along line A-A' of FIG. 3.

FIG. 4 is a view schematically illustrating a cross section taken along line A-A' of FIG. 3.

According to an embodiment, FIG. 3 may be a schematic cross-sectional view of the motor assembly illustrated in FIG. 1.

With reference to FIG. 3, the motor assembly 100 according to an embodiment of the disclosure may further include an outer housing 310, at least one outlet 320, and/or a rear cover 330.

According to an embodiment, the outer housing 310 may be coupled to the first housing 150a. The outer housing 310 may be coupled to the second direction (e.g., the right side) of the first housing 150a. The outer housing 310 may be coupled to the second surface (e.g., the right surface) of the first housing 150a. The outer housing 310 may not be constructed separately, but may be constructed by integrally extending the first housing 150a.

According to an embodiment, the outlet 320 may be formed at least in part between the outer housing 310 and the rear cover 330. The outlet 320 may discharge air introduced through the opening 172 of the cover 170. The outlet 320 may discharge heat of the stator 110 transferred through the heat transfer member 135 and the heat dissipation member 130.

According to an embodiment, the rear cover 330 may be disposed in the second direction (e.g., the right side) of the printed circuit board 180. The rear cover 330 may protect internal components of the motor assembly 100 together with the cover 170 provided on the front of the motor assembly 100.

According to an embodiment, the printed circuit board 180 may transmit a signal capable of generating an electromagnetic force to the coil 113 of the stator 110 to drive the motor assembly 100. The electromagnetic force generated by the coil 113 of the stator 110 may interact with the magnet 123 of the rotor 120 and thereby rotate the rotating shaft 121.

According to an embodiment, when the rotating shaft 121 is rotated, the impeller 160 coupled to one end of the rotating shaft 121 may also be rotated. When airflow is generated in response to the rotation of the impeller 160, air introduced through the opening 172 of the cover 170 may pass through the guide hole 155a of the first housing 150a and the heat dissipation member 130 and then be discharged through the outlet 320 as indicated by arrows shown in FIG. 3.

According to an embodiment, as the rotating shaft 121 rotates at a high speed, heat may be generated in the coil 113 of the stator 110. The heat generated in the stator 110 may be transferred to the heat dissipation member 130 through the heat transfer member 135 surrounding at least a portion of the stator 110. The heat dissipation member 130 may lower the internal temperature of the motor assembly 100 by discharging the heat through the heat dissipation fins 132 and/or discharging it to the outside of the motor assembly 100 through the outlet 320.

According to an embodiment, the heat dissipation member 130 and/or the heat transfer member 135 surrounding or wrapping at least a portion of the outer surface of the stator 110 may also suppress the vibration of the stator 110 caused by the rotation of the rotor 120.

Figure 5:
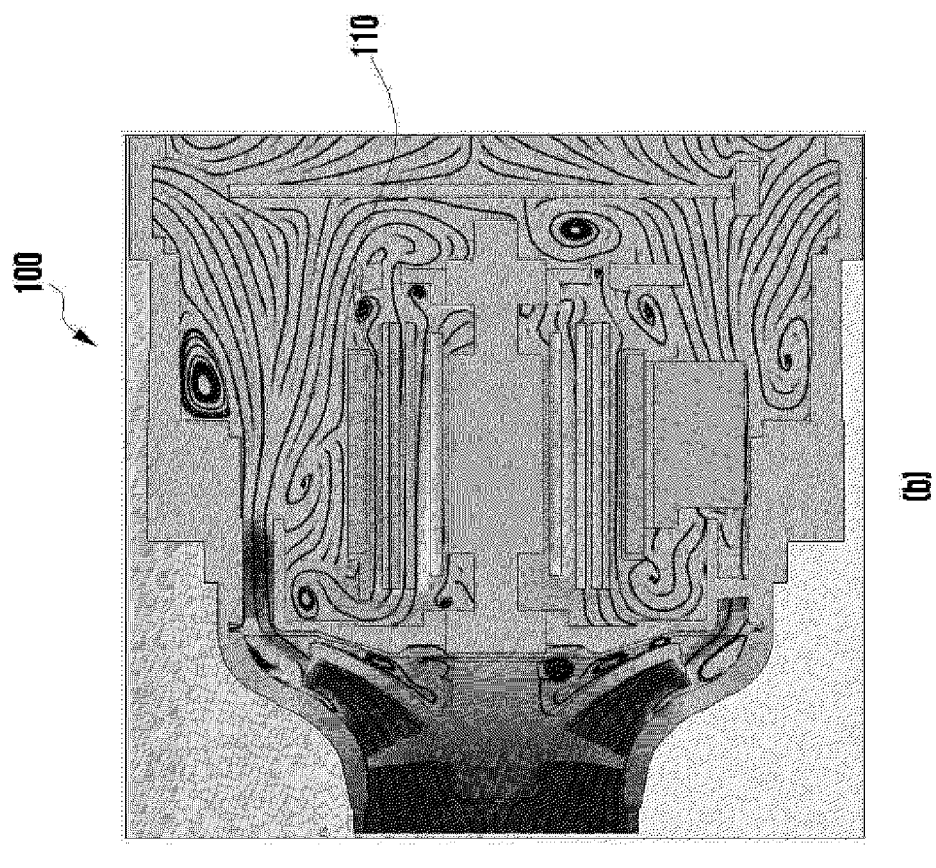
FIG. 5 is a view illustrating a comparison of surface temperatures of a conventional stator in a conventional motor assembly and a motor assembly according to an embodiment of the disclosure.
Figure 5:
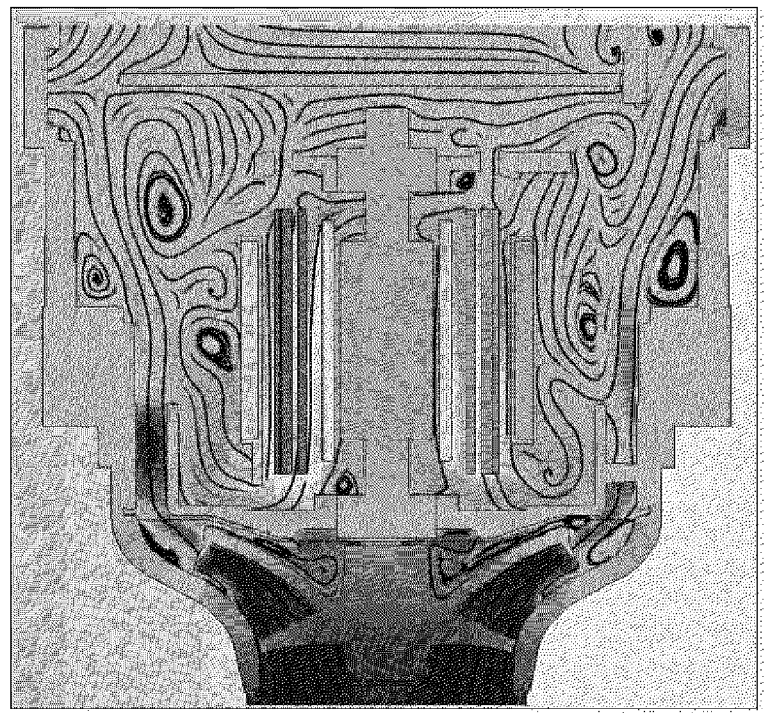

FIG. 5 is a view illustrating a comparison of surface temperatures of a conventional stator in a conventional motor assembly and a motor assembly according to an embodiment of the disclosure.

In FIG. 5, (a) shows the surface temperature of the conventional motor assembly in which the heat dissipation member and the heat transfer member are not disposed on the outer surface of the stator.

With reference to (a) of FIG. 5, in the conventional motor assembly in which the heat dissipation member and the heat transfer member are not disposed on the outer surface of the stator, the surface temperature of the stator may rise to about 65° C. to 75° C.

In FIG. 5, (b) shows the surface temperature of the motor assembly 100 according to an embodiment of the disclosure in which the heat dissipation member 130 and the heat transfer member 135 are disposed on the outer surface of the stator 110.

With reference to (b) of FIG. 5, in the motor assembly 100 according to an embodiment of the disclosure in which the heat dissipation member 130 and the heat transfer member 135 are disposed on the outer surface of the stator 110, the surface temperature of the stator 110 may be lowered to about 60° C. to 63° C.

Figure 6:
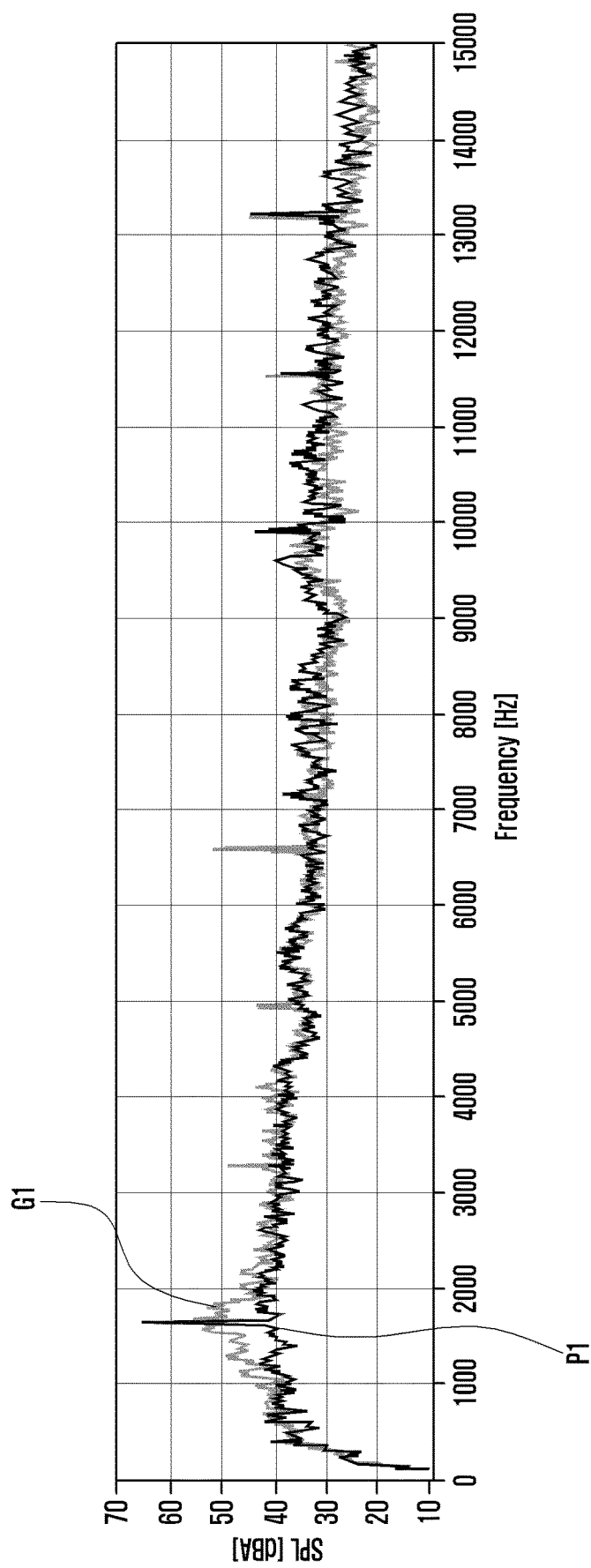
FIG. 6 is a view illustrating a comparison of peak noise levels of a conventional motor assembly and a motor assembly according to an embodiment of the disclosure.

FIG. 6 is a view illustrating a comparison of peak noise levels of a conventional motor assembly and a motor assembly according to an embodiment of the disclosure.

In the conventional motor assembly, the heat dissipation member and the heat transfer member may not be disposed on the outer surface of the stator.

However, in the motor assembly 100 according to an embodiment of the disclosure, the heat dissipation member 130 and the heat transfer member 135 may be disposed on the outer surface of the stator 110.

With reference to FIG. 6, in the conventional motor assembly, the noise level of the motor assembly in which the heat dissipation member and the heat transfer member are not disposed on the outer surface of the stator may be as indicated by G1. In an embodiment of the disclosure, the noise level of the motor assembly 100 in which the heat dissipation member 130 and the heat transfer member 135 are disposed on the outer surface of the stator 110 may be as indicated by P1.

The peak in noise level P1 of the motor assembly 100 according to an embodiment of the disclosure is about 10 dB to 13 dB in a frequency band of about 1600 Hz, which is improved in comparison with the peak in the noise level G1 of the conventional motor assembly.

While the disclosure has been described in detail with reference to various embodiments, it is natural that various changes and modifications made by those of ordinary skill in the art to which the disclosure pertains within the scope of the disclosure are also included in the disclosure.

The invention claimed is:

1. A motor assembly comprising:
   a stator including a coil;
   a rotor accommodated inside the stator and configured to rotate;
   first and second housings coupled to first and second sides of the stator;
   an impeller disposed in a first direction of the first housing and configured to rotate together with the rotor by being coupled to one side of the rotor;
   a cover having an opening through which air is introduced by rotation of the impeller, and configured to protect the impeller;
   a heat dissipation member surrounding at least a portion of an outer surface of the stator and configured to reduce heat generated in the motor assembly as the rotor rotates;
   a printed circuit board disposed in a second direction to the second housing and configured to transmit a motor driving signal to the stator;

an outer housing coupled in a second direction to the first housing; and
a rear cover disposed in the second direction to the printed circuit board.

2. The motor assembly of claim 1, further comprising:
a heat transfer member disposed between the stator and the heat dissipation member and configured to transfer the heat generated in the motor assembly to the heat dissipation member.

3. The motor assembly of claim 1, further comprising:
a vibration-proof member disposed between the stator and the heat dissipation member and configured to dampen vibration of the stator caused by rotation of the rotor.

4. The motor assembly of claim 1, wherein the heat dissipation member includes a plurality of heat dissipation fins extending radially from an outer surface thereof.

5. The motor assembly of claim 1, wherein the heat dissipation member is constructed to be separated or integrated in a circumferential direction with other components of the motor assembly.

6. The motor assembly of claim 2, wherein the heat transfer member is configured to be thicker than a space between the stator and the heat dissipation member, and is deformed to have a reduced thickness when the stator and the heat dissipation member are coupled using the first housing and the second housing.

7. The motor assembly of claim 1, further comprising:
a first support member coupled in the first direction to the stator and a second support member coupled in a second direction to the stator,
wherein the first support member and the second support member are configured to suppress vibration by supporting the stator.

8. The motor assembly of claim 7, wherein the first support member further comprises:
a first bearing disposed at a center of the first support member and inserted in the first direction to a rotating shaft of the rotor; and
a first coupling part extending from an outer circumferential surface of the first supporting member in the second direction.

9. The motor assembly of claim 8, wherein the second support member further comprises:
a second bearing disposed at a center of the second support member and inserted in the second direction to the rotating shaft of the rotor; and
a second coupling part extending from an outer circumferential surface of the second supporting member in the first direction.

10. The motor assembly of claim 9, wherein the first coupling part and the second coupling part are configured to be coupled through a slot formed on the outer surface of the stator.

11. The motor assembly of claim 9, wherein the first housing further comprises:
a first engaging part formed in a center of the first housing and engaging with at least a portion of the first bearing;
a first fastening part extending in the second direction from a predetermined location of the first housing; and
a guide hole guiding air flow from an outside of the motor assembly.

12. The motor assembly of claim 11, wherein the second housing includes:
a second engaging part formed in a center of the second housing and engaging with at least a portion of the second bearing; and
a second fastening part extending in the first direction from a predetermined location of the second housing.

13. The motor assembly of claim 1, further comprising:
an outlet formed at least in part between the outer housing and the rear cover.

14. The motor assembly of claim 13, wherein the air introduced through the opening of the cover passes through a guide hole of the first housing and a heat dissipation fin of the heat dissipation member, and is discharged through the outlet.

15. The motor assembly of claim 2, wherein the heat dissipation member and/or the heat transfer member surrounding at least a portion of the outer surface of the stator is configured to suppress vibration of the stator caused by rotation of the rotor.

16. The motor assembly of claim 1, wherein the heat dissipation member comprises a heat sink.

17. The motor assembly of claim 1, wherein the heat dissipation member is made of metal or plastic.

18. The motor assembly of claim 1, wherein an outer surface of the heat dissipation member is constructed to include a black or anodizing coating.

* * * * *